United States Patent
Terry, III

(10) Patent No.: US 7,160,460 B2
(45) Date of Patent: *Jan. 9, 2007

(54) SYSTEM AND METHOD FOR TREATING WASTEWATER USING COIR FILTER

(75) Inventor: Theophilus B. Terry, III, Hodgenville, KY (US)

(73) Assignee: Quanics, Inc., Crestwood, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/429,412

(22) Filed: May 5, 2003

(65) Prior Publication Data

US 2004/0099589 A1 May 27, 2004

Related U.S. Application Data

(63) Continuation-in-part of application No. 10/379,037, filed on Mar. 4, 2003, now Pat. No. 6,890,433, which is a continuation-in-part of application No. 09/834,318, filed on Apr. 13, 2001, now Pat. No. 6,592,755.

(51) Int. Cl.
*C02F 3/00* (2006.01)

(52) U.S. Cl. .................. 210/615; 210/616; 210/617

(58) Field of Classification Search ......... 210/615–617
See application file for complete search history.

(56) References Cited

U.S. PATENT DOCUMENTS

| | | | |
|---|---|---|---|
| 3,662,918 A | 5/1972 | Crawford et al. | |
| 3,767,051 A | 10/1973 | Thompson | |
| D229,053 S | 11/1973 | Le Blanc | |
| 3,859,214 A | 1/1975 | Lang et al. | |
| 3,969,482 A * | 7/1976 | Teller | 423/235 |
| 4,325,823 A | 4/1982 | Graham | |
| 4,363,732 A | 12/1982 | Crates et al. | |
| 4,961,670 A | 10/1990 | McKenzie et al. | |
| 5,049,265 A | 9/1991 | Boyd et al. | |
| 5,206,206 A | 4/1993 | Buelna et al. | |
| 5,217,616 A | 6/1993 | Sanyal et al. | |
| 5,264,129 A * | 11/1993 | Simpson et al. | 210/611 |
| 5,281,402 A * | 1/1994 | Gohara et al. | 423/210 |
| 5,318,699 A | 6/1994 | Robertson et al. | |
| D357,530 S | 4/1995 | Grenier et al. | |
| 5,458,662 A | 10/1995 | Toyone | |
| 5,645,732 A | 7/1997 | Daniels | |
| 5,707,513 A | 1/1998 | Jowett et al. | |
| 5,728,185 A * | 3/1998 | Buchholz et al. | 96/374 |
| 5,762,784 A | 6/1998 | Jowett | |
| 5,762,793 A | 6/1998 | Nurse, Jr. | |
| 5,980,739 A | 11/1999 | Jowett et al. | |
| 6,099,722 A | 8/2000 | Tittlebaum et al. | |
| 6,153,094 A | 11/2000 | Jowett et al. | |
| 6,171,507 B1 | 1/2001 | Roy et al. | |
| 6,190,548 B1 | 2/2001 | Frick | |

(Continued)

FOREIGN PATENT DOCUMENTS

DE 44 15 963 11/1995

(Continued)

*Primary Examiner*—Chester T Barry
(74) *Attorney, Agent, or Firm*—Charles G. Lamb; Middleton Reutlinger

(57) ABSTRACT

A wastewater treatment system includes a septic tank having a discharge in flow communication with one or more biofilter containers having filter media therein. Wastewater or effluent from the septic tank is allowed to contact the filter media and each container includes an outlet for discharging the wastewater to the environment or transferred to other treatment facilities.

23 Claims, 14 Drawing Sheets

U.S. PATENT DOCUMENTS

| | | |
|---|---|---|
| 6,267,882 B1 | 7/2001 | Houck et al. |
| 6,280,614 B1 | 8/2001 | Berg et al. |
| 6,328,890 B1 | 12/2001 | Thibault |
| 6,620,321 B1 | 9/2003 | Festa et al. |
| 2002/0134728 A1 | 9/2002 | Festa et al. |
| 2004/0131526 A1* | 7/2004 | Johnson et al. ........ 423/243.11 |
| 2004/0163536 A1* | 8/2004 | Baudat et al. ................ 95/214 |

FOREIGN PATENT DOCUMENTS

| | | |
|---|---|---|
| DE | 44 45 440 | 12/1995 |
| DE | 195 30 760 | 2/1996 |

* cited by examiner

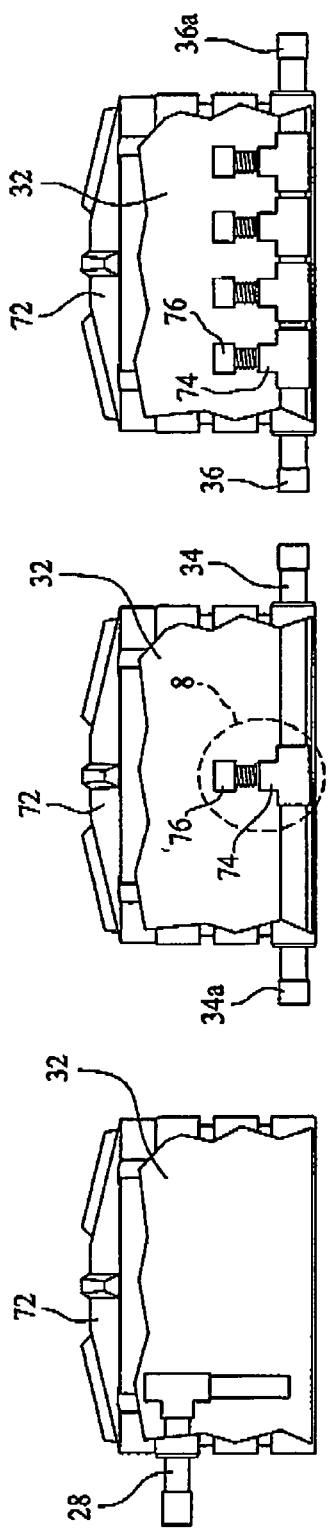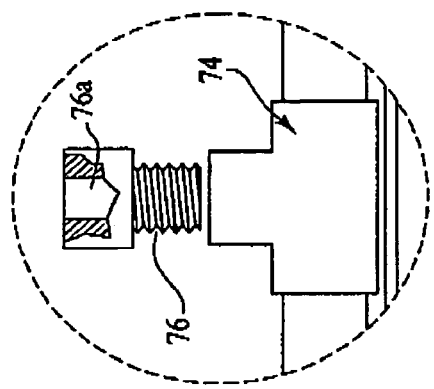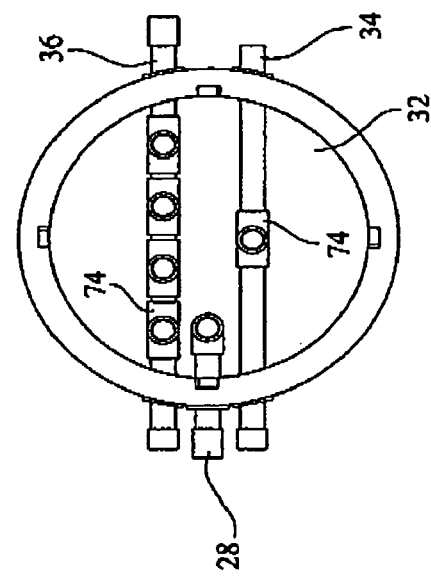

SYSTEM AND METHOD FOR TREATING WASTEWATER USING COIR FILTER

CROSS-REFERENCE TO PRIOR APPLICATION

This continuation-in-part application claims priority to and benefit from currently U.S. patent application Ser. No. 10/379,037, filed Mar. 4, 2003, now U.S. Pat. No. 6,890,433 which is a continuation-in-part of and claims priority to and benefit from currently pending U.S. patent application Ser. No. 09/834,318, filed on Apr. 13, 2001, now U.S. Pat. No. 6,592,755 which are incorporated herein by reference.

BACKGROUND OF THE INVENTION

This invention relates to a system for treating wastewater and more particularly for the treatment of wastewater including the use of filtering materials such as aerobic biofilters.

In the treatment of wastewater, such as sewage and the like, it is common to provide a septic tank with an inlet in an upper portion to receive the wastewater. The septic tank is provided with, and generally on the opposite side from the inlet, an outlet discharge which is in flow communication with laterals for discharging effluent into an open field or the like. In the septic tank, the particulate materials settle to the bottom while the effluent is removed through the laterals. Moreover, it has become common practice to install filters at the outlet discharge from the septic tank to remove undissolved solid particulate materials thereby preventing said materials from entering into the lateral field.

In recent years, it has been suggested to even further treat effluent from a septic tank before the wastewater is left to the environment. For example, U.S. Pat. No. 5,980,739 to Jowett et al. teaches a wastewater treatment system including an aerobic filter medium, particularly polyurethane foam particles and the like, as a biofilter. Also, U.S. Pat. No. 5,762,784 also to Jowett et al. teaches a water treatment apparatus which includes a container having apertures through the walls thereof and being opened to the atmosphere filled with open celled foam material for use in the treatment of wastewater.

SUMMARY OF THE INVENTION

It is an object of the present invention to provide a wastewater treatment system to treat organic matter, solids, and pathogens.

It is also an object of the present invention to provide a wastewater treatment system for treatment of organic matter, solids, and pathogens which is relatively inexpensive and easy to install and maintain.

More particularly, the present invention is directed to a method and apparatus for treating wastewater wherein water received within a septic tank is either pumped or gravity fed to a biotreatment container having a body of filter material therein wherein the wastewater is generally sprayed along the top of the body of filter material and is allowed to percolate slowly downwardly therethrough. Alternatively, the wastewater is pumped into a lower section of the tank, below the filter material and allowed to percolate up through the filter material. The filtered wastewater is collected in the bottom of the container, or in the alternative design, exits through an outlet pipe positioned above the filter material and then is transferred by pump or gravity into laterals, or the like, or to other parts of the environment, or is recycled for further treatment.

Even more particularly, the present invention is directed to a wastewater treatment system which includes a septic tank in flow communication with at least one biotreatment or biofilter container having a body of filter material therein. An inlet to the container is in flow communication with an outlet from the septic tank. The inlet to the container includes spray nozzles to spray wastewater over the body of filter material into the at least one container, the inlet including a conduit extending along the upper portion of the container. The filter material may be open cell foam in randomly arranged cubes within the container or, preferably, coconut coir fiber which provides for a filter medium having large openings or spaces therein so that the growth of biomatter does not plug nor unduly interfere with the filtration of the wastewater as it descends or percolates downwardly therethrough. In an alternative design, the effluent is fed to the bottom of the tank and then percolates up through the filter material. Moreover, the container is a solid wall container with a lid so that there is an adequate supply of oxygen into the container to assist in the degradation of the organic matter and pathogens therein. The system may also include an air supply tube that injects air into the container. The system may further include a recirculation device having an inlet in flow communication with the outlet from at least one biofilter container wherein the recirculation device includes two outlet conduits, one in flow communication with the septic tank and the other in flow communication with the environment or is transferred for further treatment.

A better understanding of the invention may be obtained by consideration of the drawings and the detail of a preferred embodiment set forth hereinafter.

BRIEF DESCRIPTION OF THE DRAWINGS

FIG. 4 is a first side view, with selected portions cut-away, of a recirculating tank of the present invention;

FIG. 5 is a second side view, with selected portions cut-away, of the recirculating tank of FIG. 4;

FIG. 6 is a third side view, with selected portions cut-away, of the recirculating tank of FIG. 4;

FIG. 7 is a top view of the recirculating tank of FIG. 4;

FIG. 8 is an enlarged side view, with selected portions cut-away, of the inverted "T" connections in the outlet conduits in the recirculating tank of FIG. 4;

DETAILED DESCRIPTION OF THE PREFERRED EMBODIMENT

Figure 1:
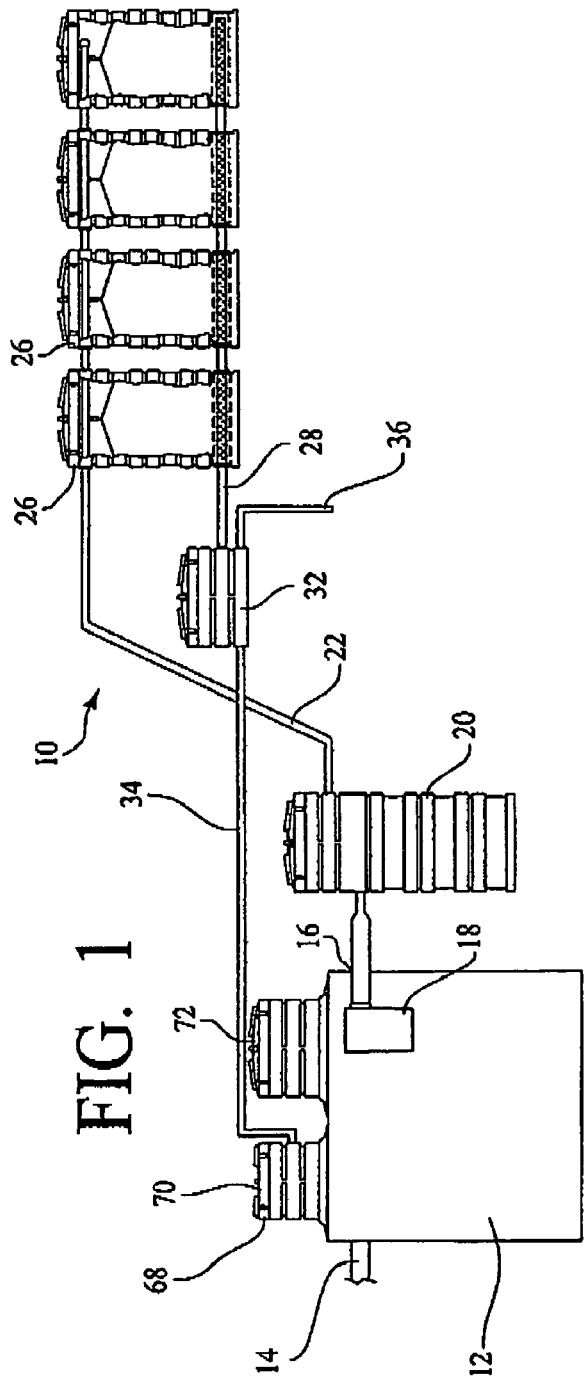
FIG. 1 is a generally schematic view of one embodiment of a wastewater system of the present invention.

As best shown in FIG. 1, a wastewater treatment system of the present invention includes septic tank 12 which receives wastewater effluent, including organic matter, pathogens, and other particulates. An inlet 14 is provided for receiving the wastewater into the septic tank 12 and an outlet 16 is provided for the discharge of wastewater therefrom. Tanks 12 are generally provided with a filter 18 attached to outlet 16 which removes most of the particulates from the wastewater that have not settled out or have broken down from the anaerobic activity occurring within the tank 12. The filter 18 may be any well known filter which is commercially available, such as the Zabel Industries's A1800 filter. The effluent, by gravity, flows from the tank 12 through the outlet 16 into a transfer, dosing, or holding tank 20. Tank 20 generally includes a pump, not shown, for pumping the effluent into a plurality of biotreatment containers 26 by way of conduit 22. It is realized that the effluent may be transferred from tank 20 to containers 26 by other means such as gravity, if appropriate.

Figure 2:
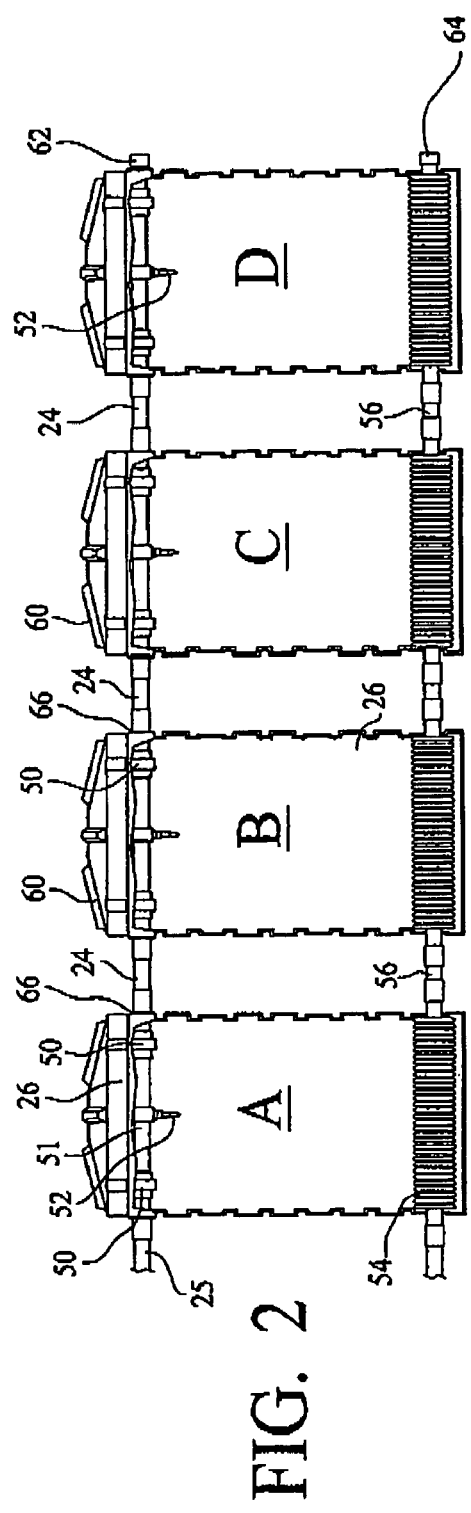
FIG. 2 is an enlarged side sectional view of a plurality of containers, including the filter medium of the present invention.
Figure 9:
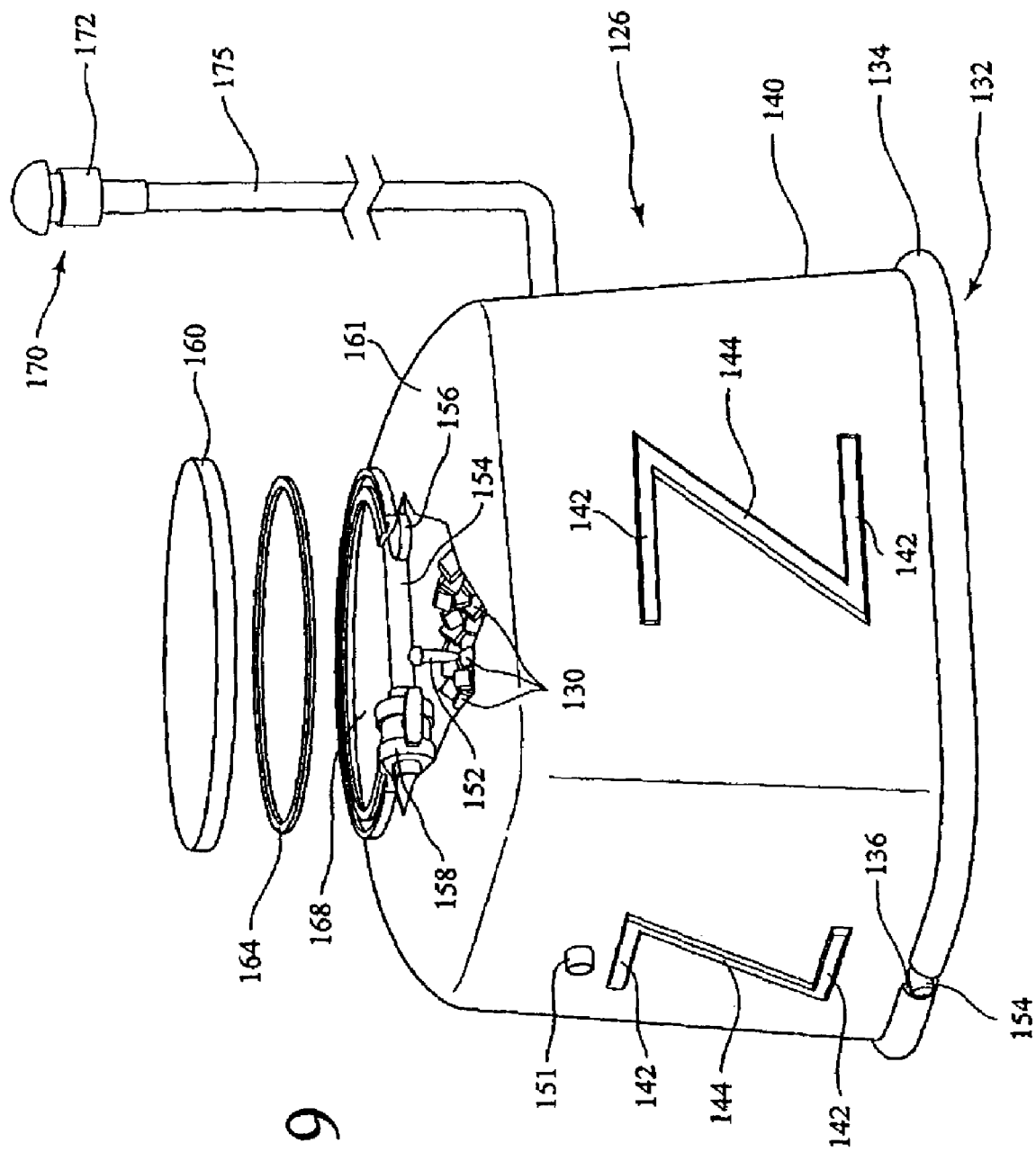
FIG. 9 is a perspective view of one embodiment of a biotreatment container of the present invention with a cut away of the wall showing the filter medium.
Figure 10:
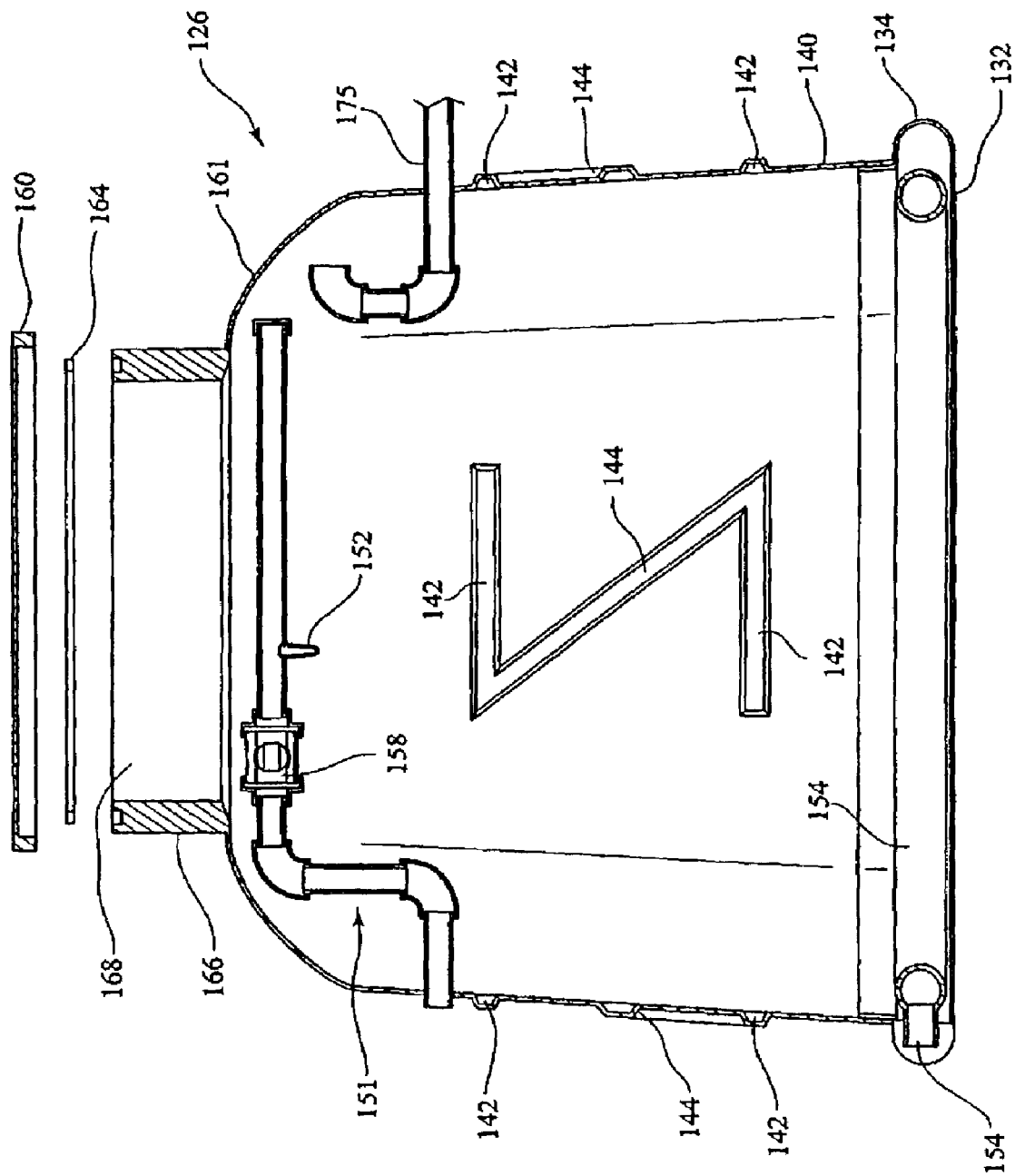
FIG. 10 is a side sectional view of another embodiment of a container of the present invention showing the internal plumbing.
Figure 14:
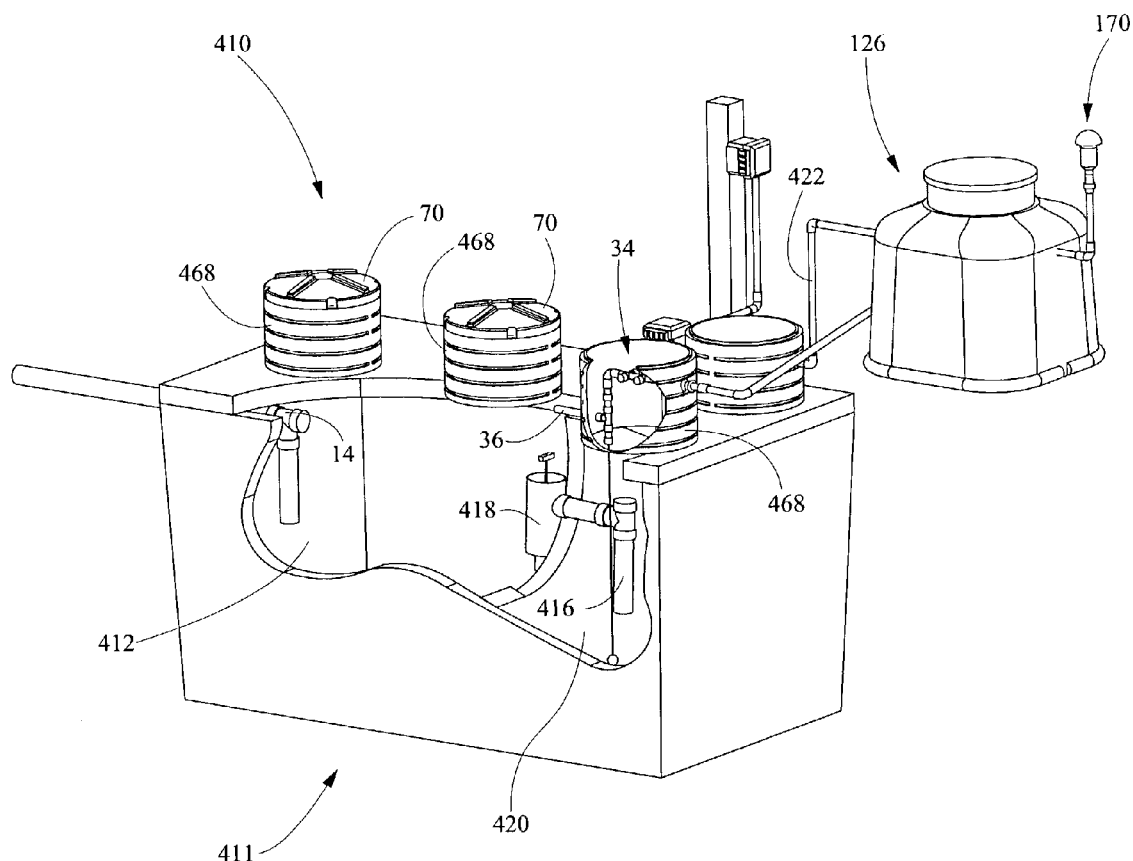
FIG. 14 is a perspective view of a system for treating wastewater using the biotreatment container of FIG. 9.
Figure 15:
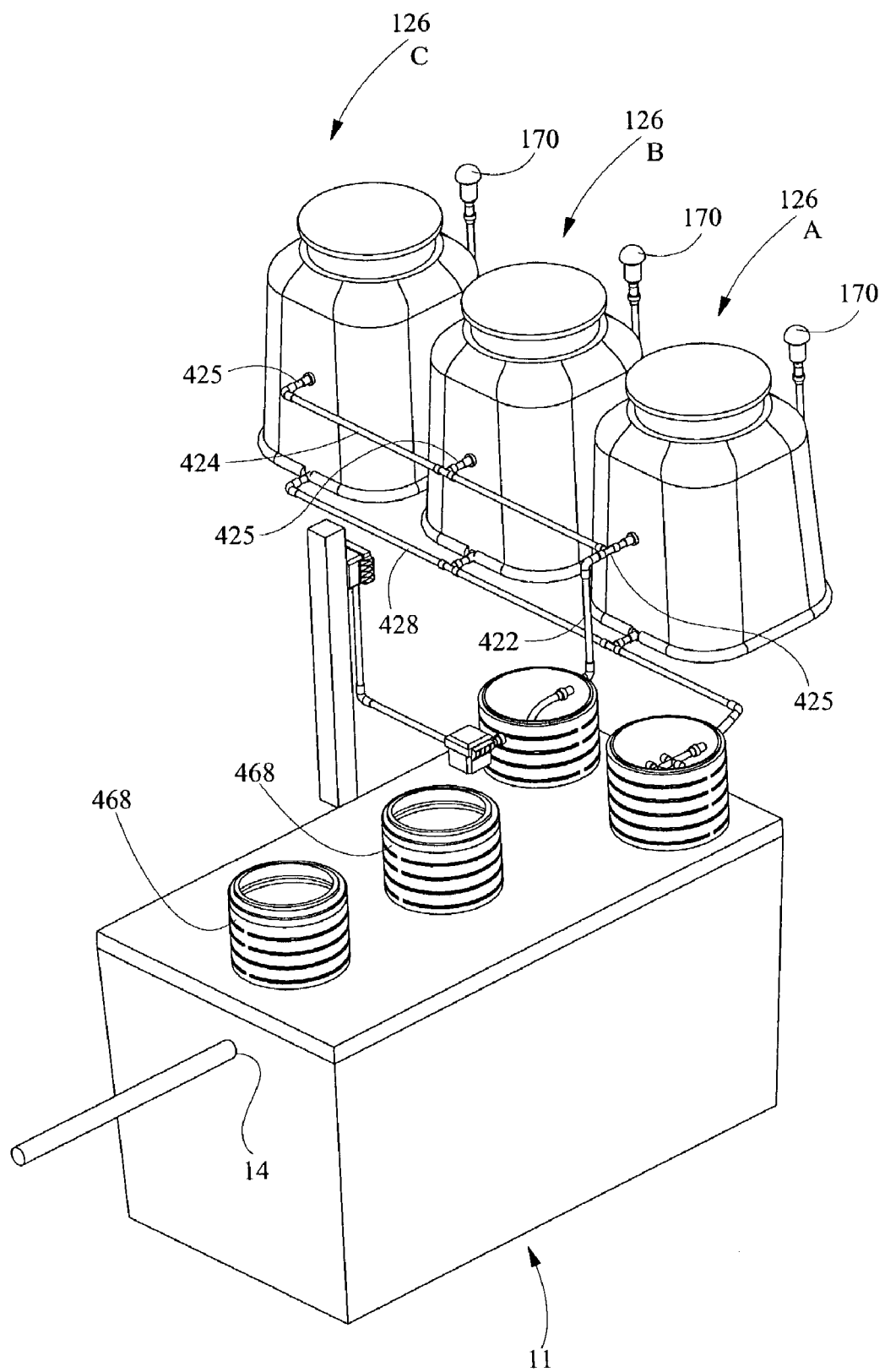
FIG. 15 is a perspective view of an alternative system for treating wastewater of the present invention comprising a plurality of biotreatment basins of FIG. 9 in fluid communication.
Figure 16:
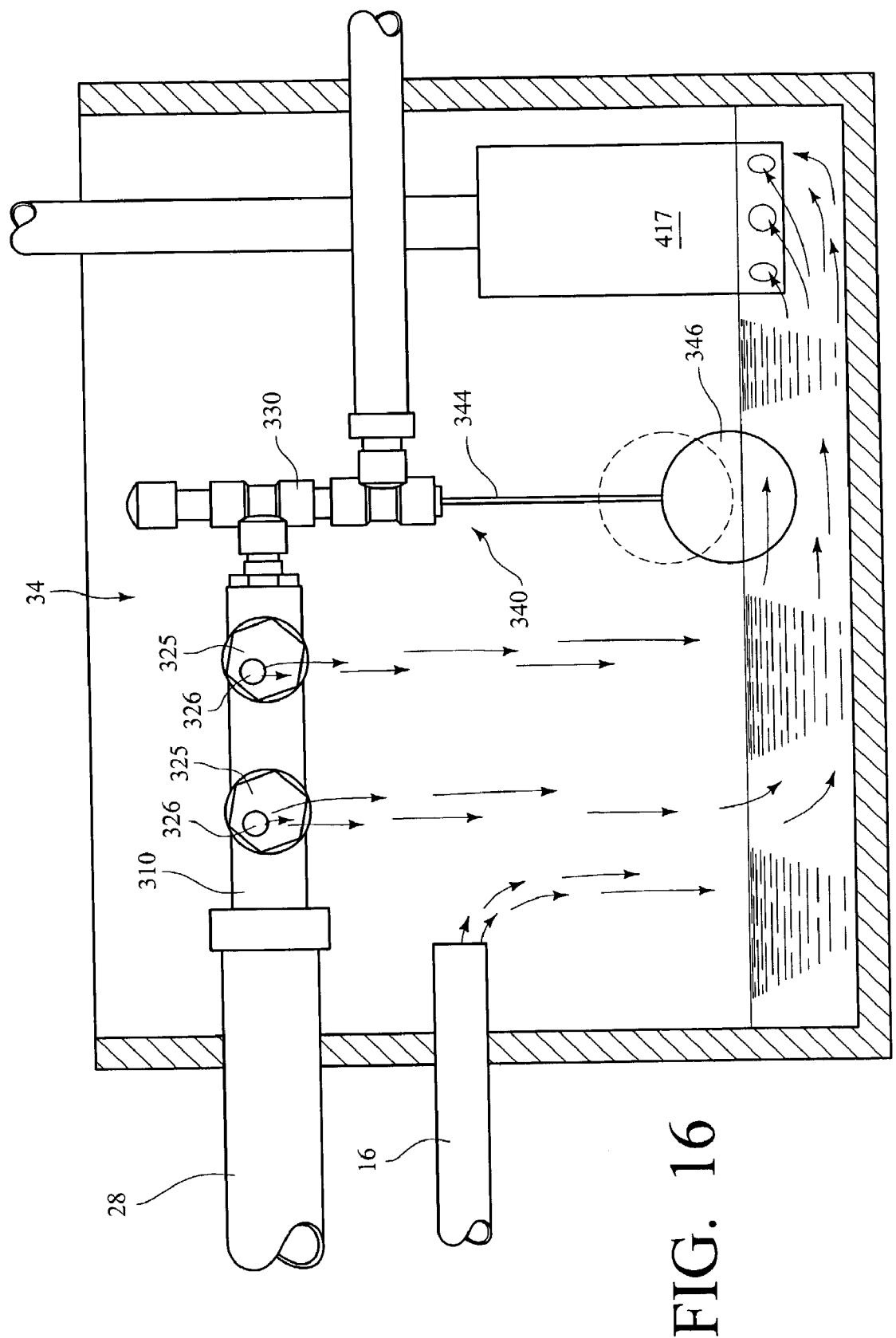
FIG. 16 is a sectional view of a tank having a recirculation device therein.
Figure 17:
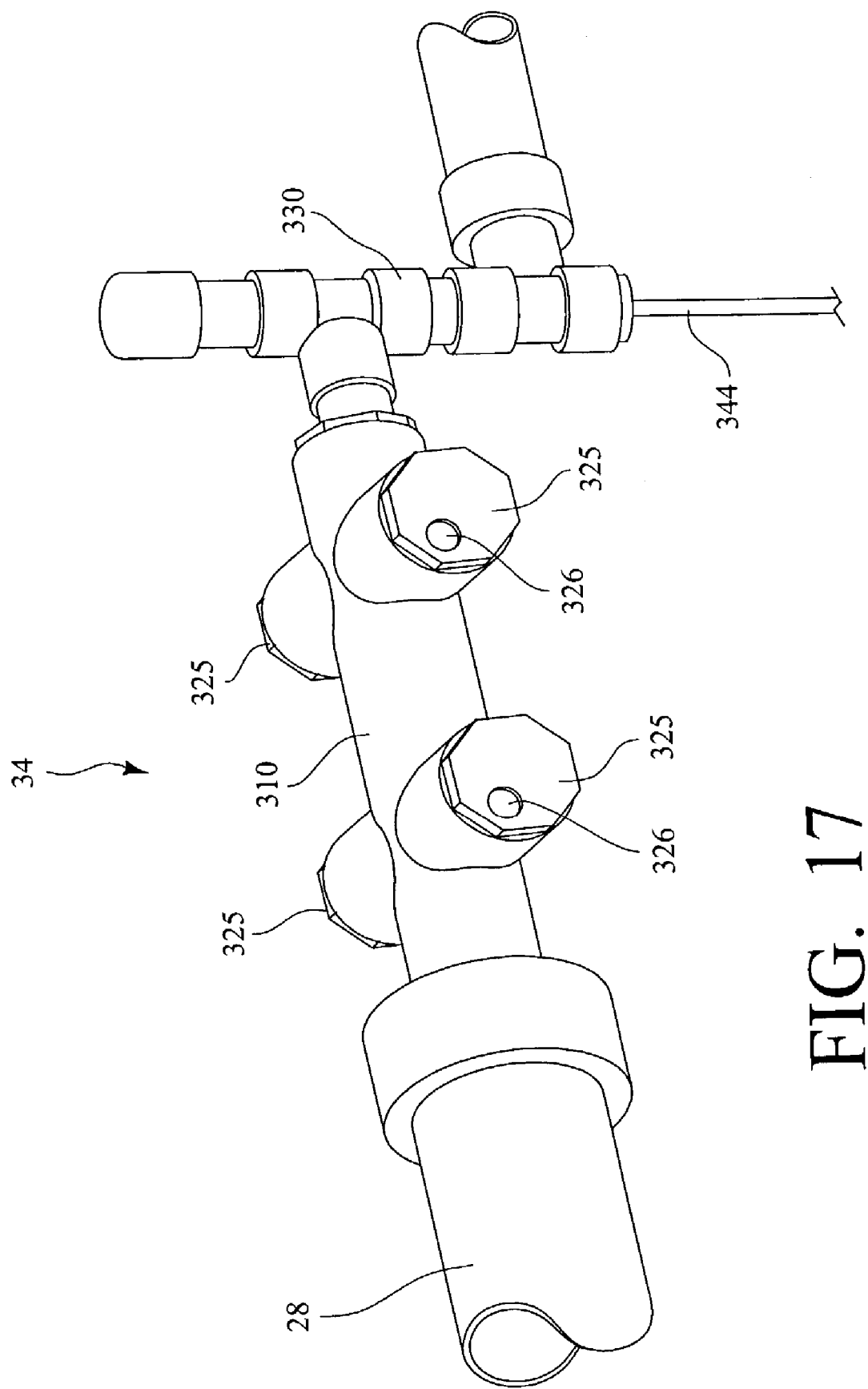
FIG. 17 is a perspective view of a recirculation device.
Figure 18:
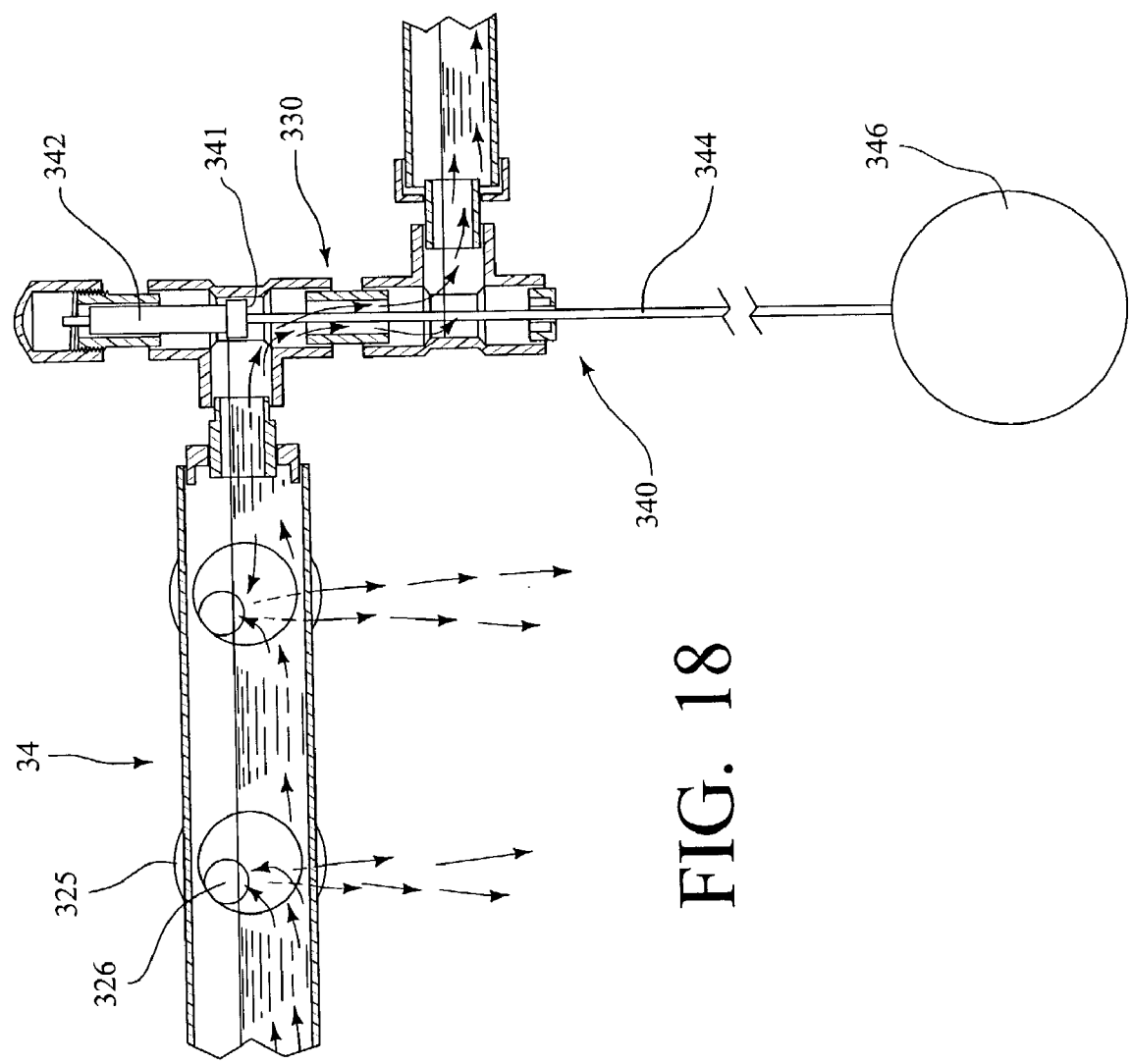
FIG. 18 is a sectional view of the recirculation device of FIG. 16 having a valve in the open position; and, FIG. 19 is a sectional view of the recirculation device of FIG. 16 having a valve in the closed position.
Figure 19:
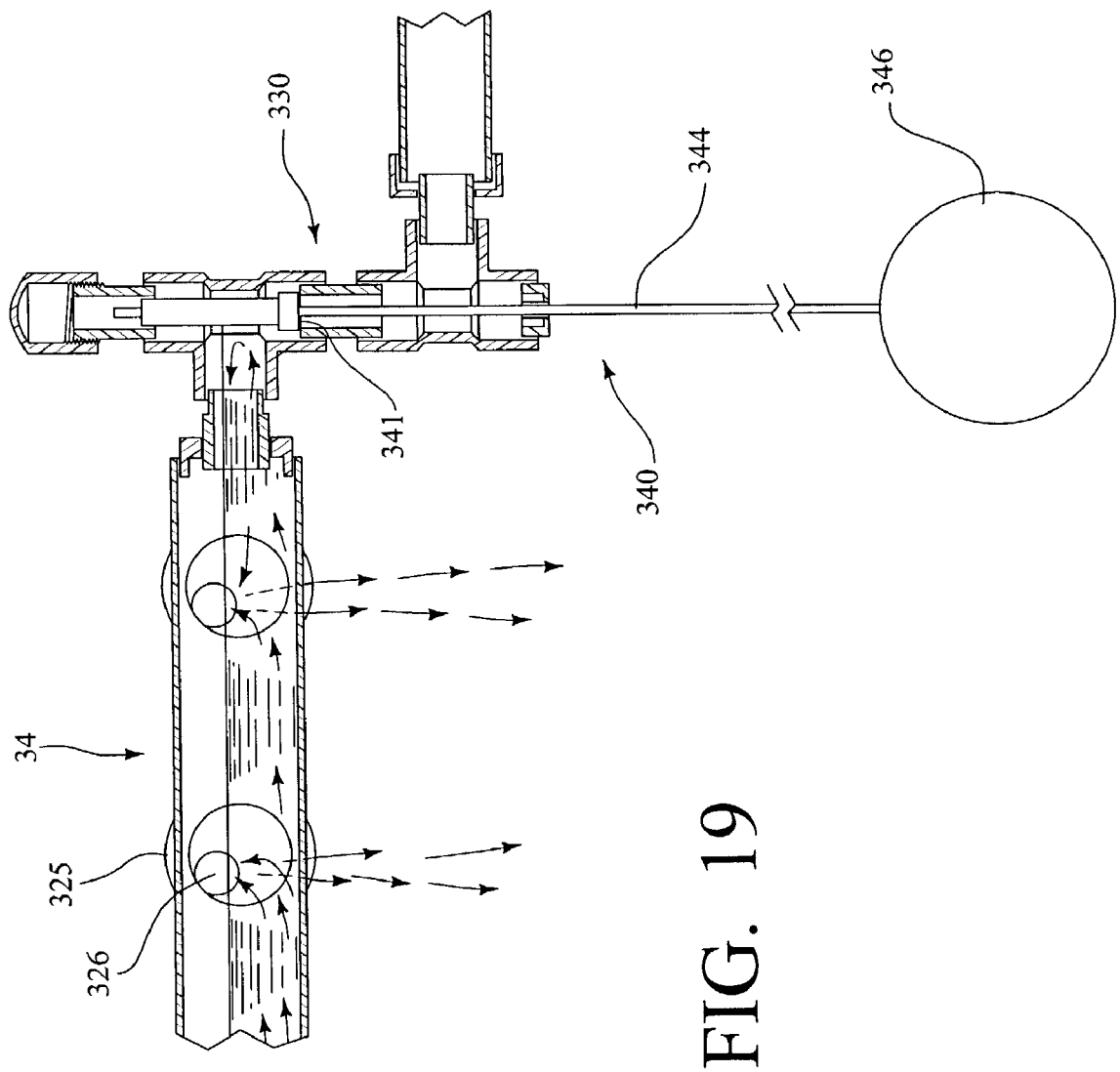

As best shown in FIG. 2, the biotreatment containers 26 can be connected in series wherein effluent pumped from effluent transfer tank 20 enters the biotreatment containers 26 through an inlet pipe 25 into a first biotreatment container 26 identified by the letter A. As shown in FIG. 2, there are four containers 26 and each container is identified by the letters A, B, C, and D, with a coupling 24 disposed therebetween with appropriate fittings, such as quick disconnects 50 and grommets 66 for quick connection and disconnection between the containers. However, other connections may be utilized in connecting the inlet effluent piping into the containers. Generally, the containers 26 are 55 gallon solid wall polyethylene drums which are relatively inexpensive and easily obtainable commercially and require a relatively small space. Each of the containers 26 is provided with at least one lid 60 to cover an access opening, generally an interlocking lid, and in many instances, two lids 60 are utilized for each container 26. In use, lids 60 generally are not sealed or tightened. As shown in FIG. 9 if the lids 160 are sealed, the seal may include a gasket seal 164 that fits between the lid 160 and the lip of the access opening, providing a tight seal. If the lid 160 is sealed to the container 126, then the lid can include air flow-through openings therein as a small portion of air is desired within the container to assist in the aerobic degradation of organic matter and pathogens in the effluent. If the lid 160 is not vented, or in addition to the vented lid 160, the container may be provided with a separate vent 170 as shown in FIGS. 9 and 14–15. The vent 170 may extend from piping 175 originating within the interior space of the container 126 up to and out of the ground so that the vent 170 is in contact with fresh air. The vent 170 removes noxious gases from the interior space of the container 126 and also provides fresh oxygenated air from the outside environment to the interior space. This helps provide an environment conducive to aerobic treatment of the wastewater trickling over the filter media 130 preferably coir filter media 130. Since the vent 170 is removing noxious gases, it may be desirable to provide a filter 172, such as a charcoal filter, on the vent so that some or all of the noxious particles are scrubbed from the air leaving the container 126. In addition, as shown in FIG. 10, the top wall 161 may have a riser 166 extending upward from the top wall 161 and terminating with the access opening 168 so that the container 126 can be buried deeper in the soil, if desired. In a further alternative forced air may be circulated through the container 126. This may be performed in a plurality of ways including placing a fan, not shown, within the container in order to circulate the air.

Figure 11:
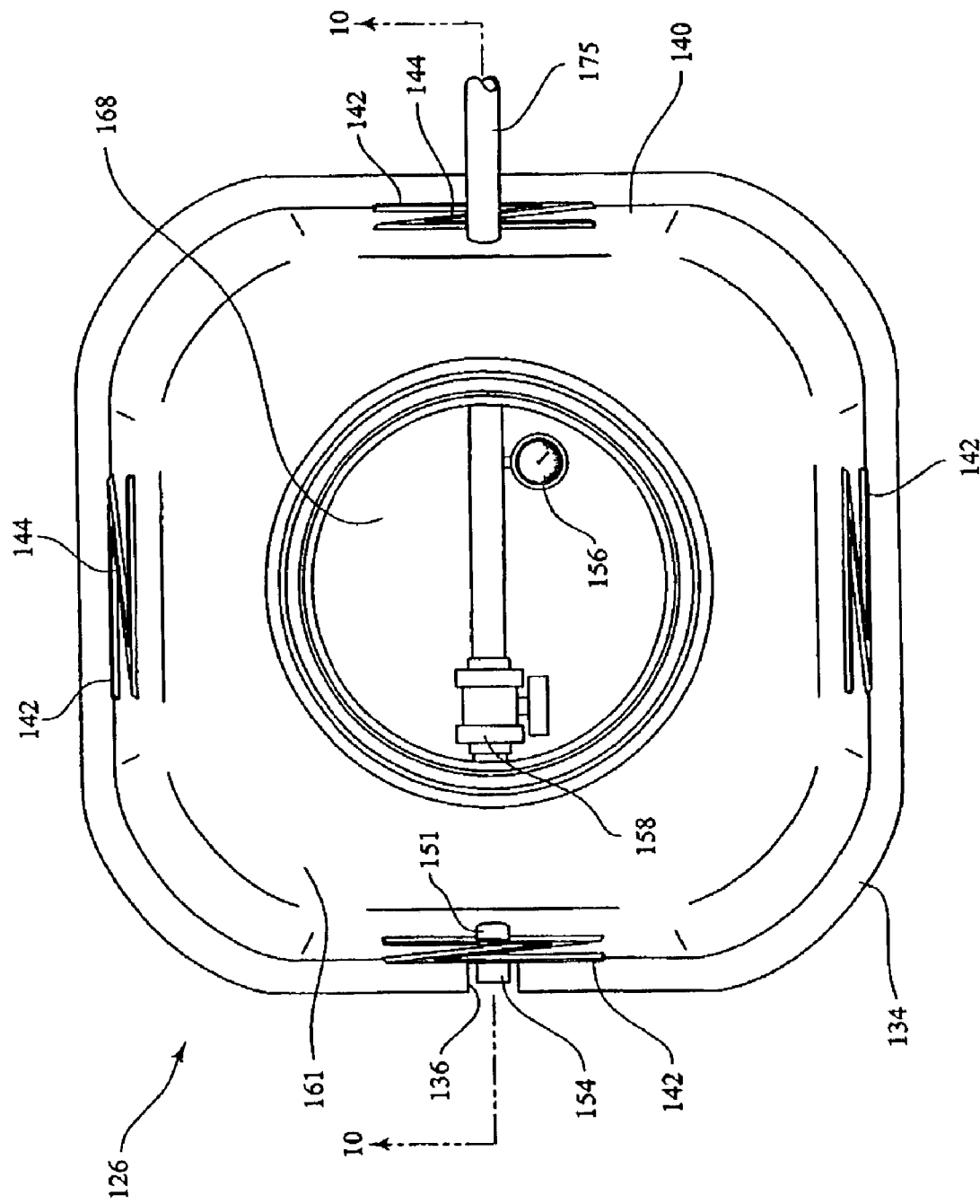
FIG. 11 is a top view of one embodiment of a container of the present invention with the lid open.
Figure 12:
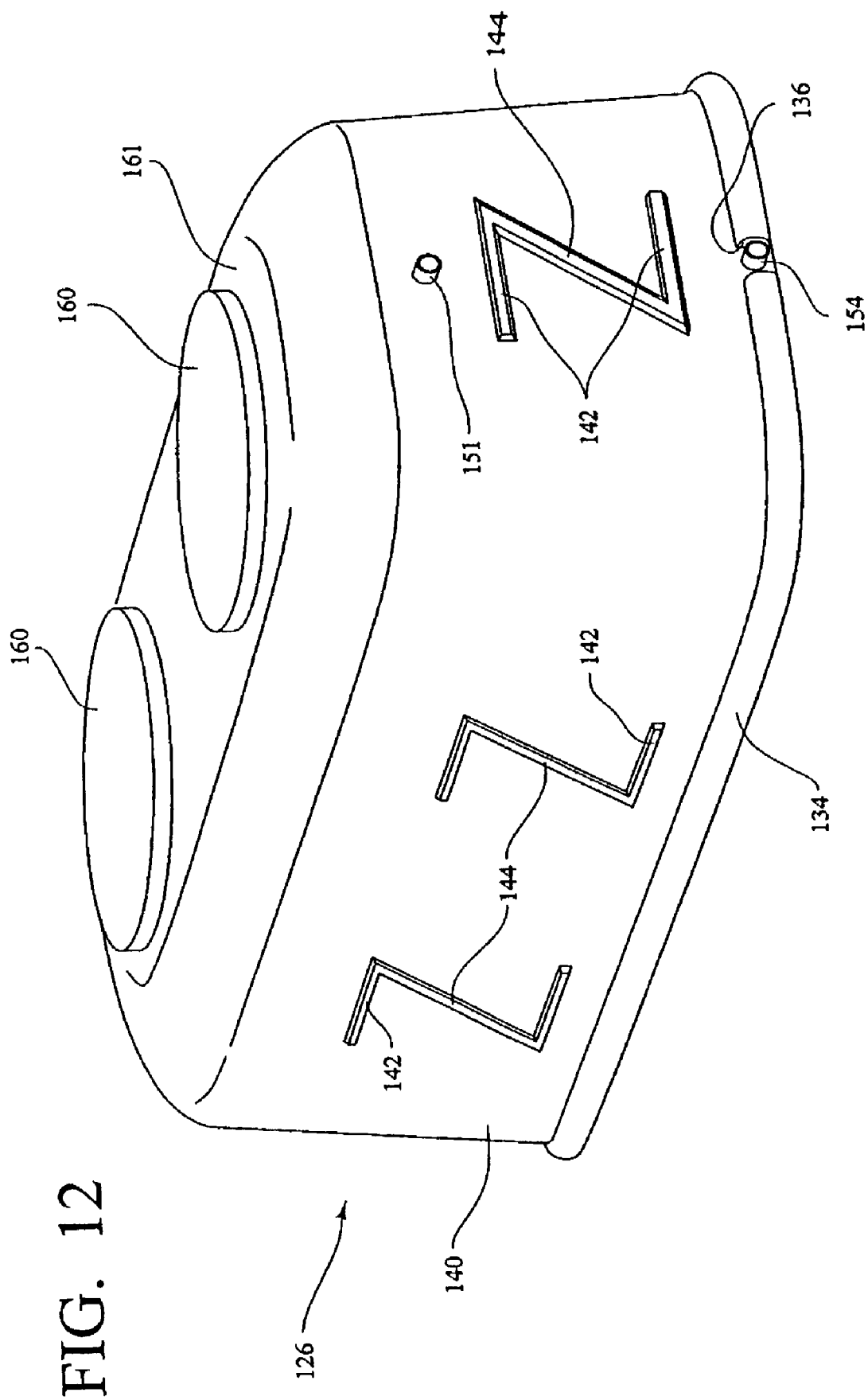
FIG. 12 is a perspective view of another embodiment of a container of the present invention having two access openings.
Figure 13:
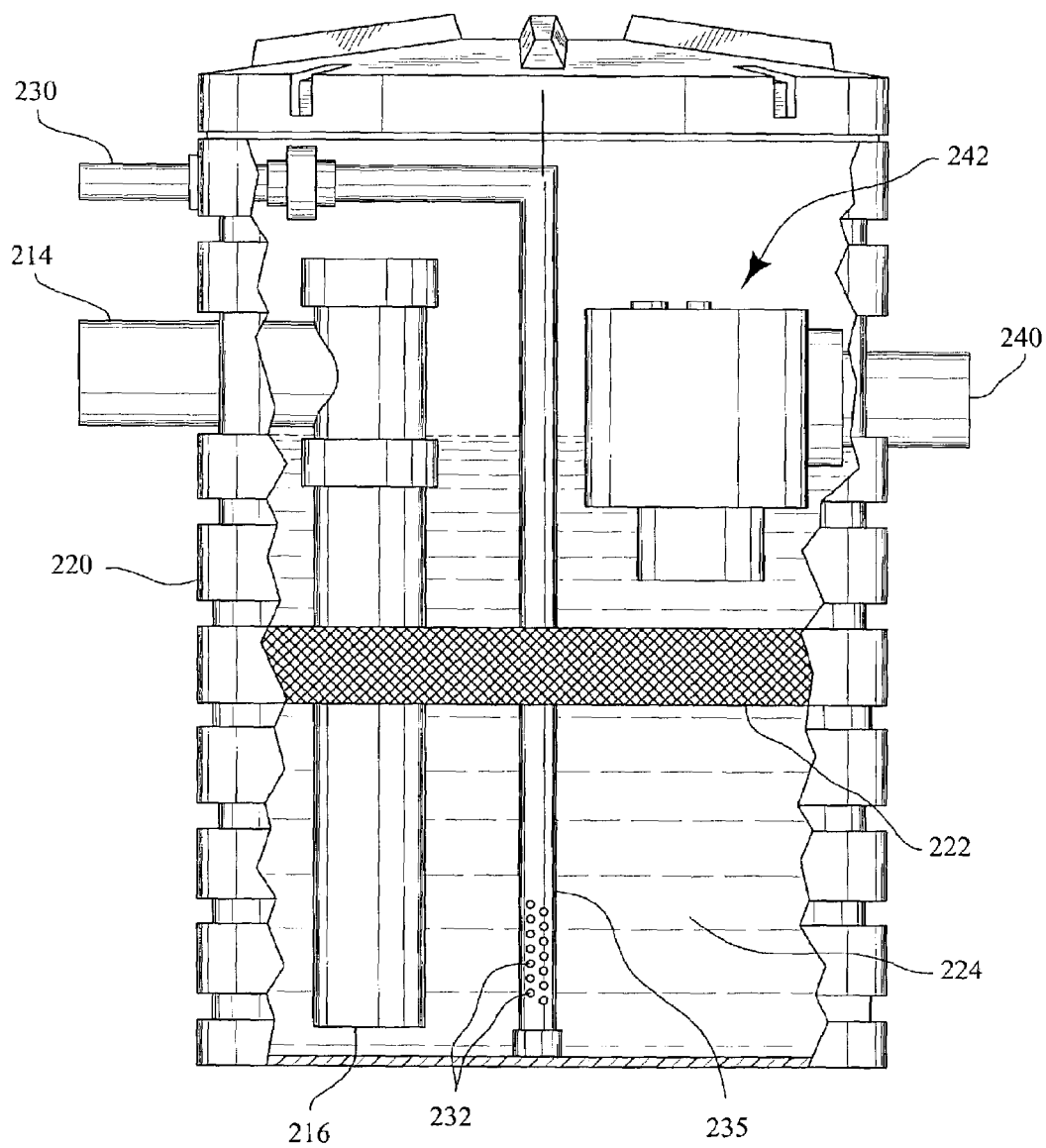
FIG. 13 is a cross-sectional view of another embodiment of a container of the present invention.

In an alternative embodiment, the biofilter containers 126 can either be connected in a series or connected to the system as individual units as seen in FIGS. 14–15. The containers in an alternative embodiment can be designed specifically for use as biofilter containers. For example, as shown in FIGS. 11, 12 and 13 the biofilter container 126 can incorporate several unique features that provide added advantages over generic drums. Biofilter container 126 is comprised of a base 132 having one or more side walls 140 extending upward from the base and connecting to a top wall 161. Together, the base 132, the side walls 140 and the top wall 161 define an interior space, as in container 26, for containing a body of filter media 130. However, in addition, and unlike container 26, the base 132 can be designed to have a larger diameter than the diameter of the top wall 161. This provides a two-fold advantage. First, a smaller top wall 161 diameter results in a smaller surface footprint when the container is buried. Second, a broader base 132 diameter results in side walls 140 that slope inward as they extend upward to top wall 161. Thus, after the tank is buried, the broader base 132 and insloping side walls 140 act as an anchor and anti-flotation device that prevents the container 126 from floating upward from its originally placed location. For ease of manufacture, the base 132 can be produced separately from the top wall 161 and side walls 140. The two components can then be combined together with a watertight seal to produce the complete biofilter container 126.

The container 126 can also have an anti-flotation ring 134 that extends outward from a peripheral edge of base 132. The anti-flotation ring also acts as an anchor or ledge that helps prevent the container 126 from floating upward from its desired location. A further anti-flotation aid can include one or more external horizontal ribs 142 projecting outward from one or more side walls 140. The external horizontal ribs 142 anchor the container 126 and prevent it from floating upward in the soil in a manner similar to that of anti-flotation ring 134. In addition, external horizontal ribs 142 provide extra structural strength to the side walls 140. Further side wall 140 strength can be added to the container 126 by the incorporation of one or more external cross container ribs 144, raised from the side walls 140 and positioned at an angle more than 0 degrees and less than or equal to 180 degrees to external horizontal ribs 144. External horizontal ribs 142 and external cross container ribs 144 can form a connected pattern, such as a "Z" as shown in FIG. 9, or may be separated from each other and still perform the desired functions.

The biofilter container 126 can be manufactured in a wide variety of shape configurations and volumes depending on the amount of wastewater to be filtered and the terrain into which the container 126 is placed and allowing for various flow-through rates and volumes of filter media 130. For example, the biofilter container 126 may have an internal volume that permits it to process between about 200 gallons per day up to about 2000 gallons per day per container. The configuration, for example, may be nearly conical with a single access opening as shown in FIG. 10, or it may have more of a rectangular configuration with two access openings, as shown in FIG. 12. Alternatively, a plurality of biotreatment containers 126 may be in fluid communication in order to process as much as 10,000 gallons per day as shown in FIG. 14. According to one exemplary embodiment, one cubic foot of coconut coir material may be used for a flow rate of wastewater of about 10 gallons per day. However, larger volumes of coir material may be used with larger flow rates at appropriate proportions.

The dosing tank 20 may be included in basin 11 as shown in FIG. 14 or may be a separate and independent unit as shown in FIG. 13 wherein the biofilter container or basin 220 is divided into an upper and a lower section. A fibrous filter 222 separates the two sections. An inlet pipe 214 passes through the fibrous filter 222 and discharges wastewater 224 out through an inlet pipe outlet section 216 from the treatment system into the lower section. An air supply tube 235 extends into the interior of the basin, passing through the fibrous filter 222 into the lower section. The air supply tube 235 can have a plurality of air diffuser holes 232 formed in a lower section of the air supply tube 235 for diffusing air into the wastewater 224 in the lower section, thus providing an aerobic environment to facilitate aerobic treatment of the wastewater 224. The fibrous filter 222 is composed of a mesh material that mechanically filters out large particles and simultaneously provides a substrate with a high surface area for the colonization of beneficial aerobic microorganisms. A preferred composition for the fibrous material is coconut coir. It provides a natural substrate with a large surface area that is highly resistant to degradation in an aquatic environment. It is also a source of organic carbon, which aids in the de-nitrification of the wastewater 224. Like materials with similar properties, as would be known by one having skill in the art, would also be suitable as a mesh material for the fibrous filter 222. As the wastewater 224 fills the lower section, it encounters the fibrous filter 222 and is filtered mechanically of larger particulate matter and crosses into the upper section. Simultaneously, the wastewater 224 is biotreated by microorganisms colonizing the surface area of the fibrous filter 222. Treated water in the upper section exits the basin 220 through an outlet pipe 240. The outlet pipe 240 may further have an outlet filter 242 affixed to it for additional particulate filtration.

Figure 3:
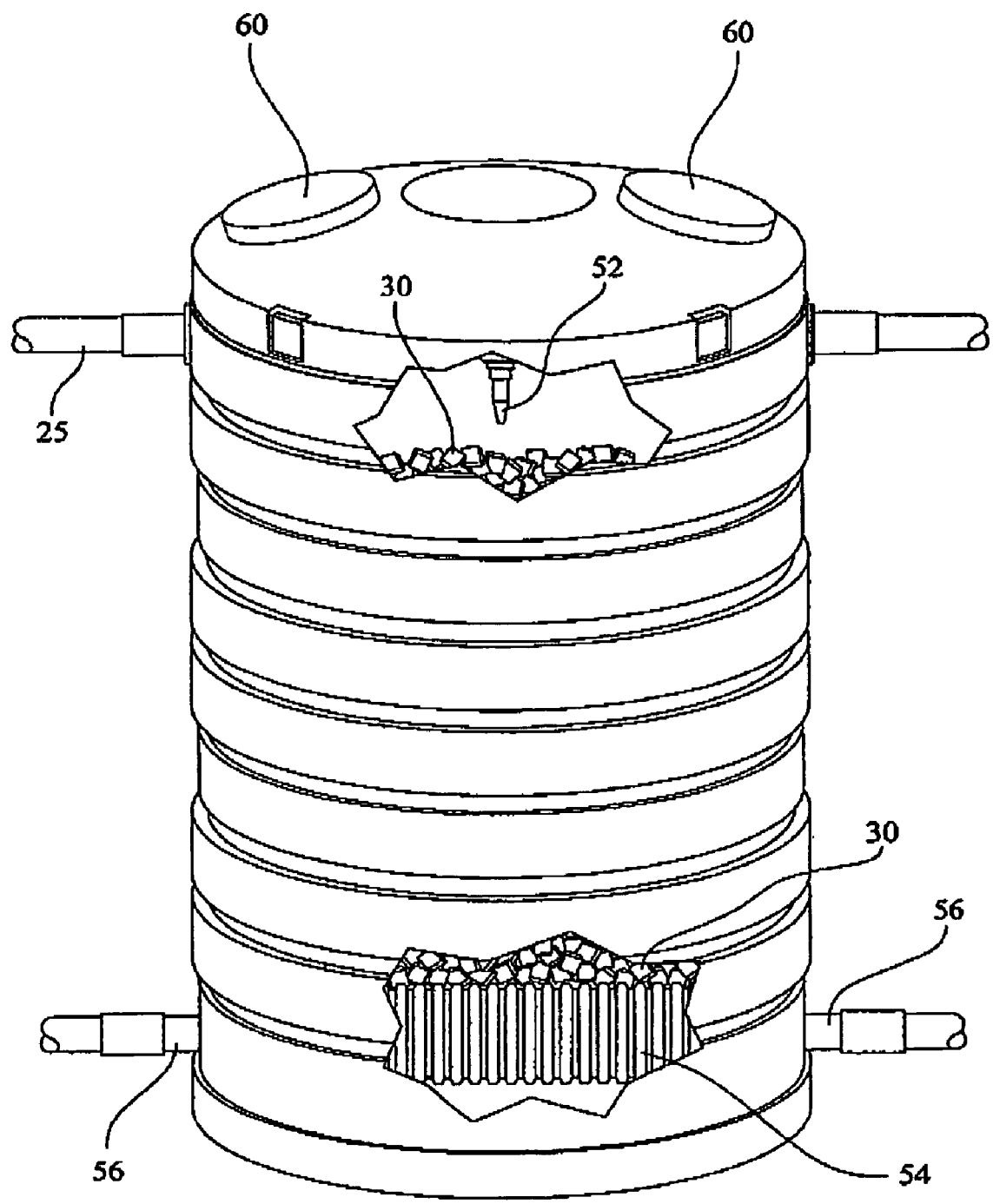
FIG. 3 is an enlarged perspective view, with selected portions cut away, of a preferred container with filter medium therein of the present invention.

The containers 26, as best shown in FIG. 3 in one embodiment include 2"×2"×2" polyurethane foam cubes or blocks as a filter media or material for the effluent. Other filter media, such as organic peat or coconut coir may be used. Additionally, inorganic materials, such as sand or gravel may also be used. The filter media may optionally be contained within a filter media containment bag (not shown). This allows for easy removal of the entire body of filter media when required for cleaning or replacing.

Within each container 26 and disposed between the quick disconnects 50 is a conduit 51 with a spray nozzle 52 therein. A preferred spray nozzle 52 is a BETE spray nozzle and a preferred sizing of the piping for the 55 gallon containers 26 is 1.25" schedule 40 PVC conduits. The containers 26 can be connected in series and on the end of the coupling extending beyond the last container 26, identified by the letter D, is a plug or cap 62.

Alternatively, wastewater influent may be introduced to the treatment container 126 in either of two methods. In a first method, the influent may enter the biotreatment container 126 at an upper portion thereof allowing the influent to percolate downward through the filter media 130. Within each container 126 of the embodiments shown in FIGS. 9–12 and 14–15 is a conduit 151 with a spray nozzle 152 therein. A preferred spray nozzle 152 is a BETE spray nozzle and a preferred sizing of the piping for the biotreatment basin or container 126 is 1.25" schedule 40 PVC conduits. The inlet conduit 151 also include a pressure regulator 158 and a gauge 156 for measuring pressure, along with a spray nozzle 152. The entire inlet conduit 151, including associated spray nozzle 152, pressure regulator 158 and gauge 156 can be pre-plumbed into the container 126 at the time of manufacture to make installation less difficult for the end user.

Disposed along the bottom of the containers 26 is a discharge conduit piping arrangement which includes a plurality of couplings 56 disposed between each of the containers 26 and is connected to perforated pipes 54 which are disposed along the bottom of the biotreatment containers 26. Preferably the couplings will be of 1.25" schedule 40 PVC and the perforated pipes 54 which are attached to the couplings 56 generally have a diameter of approximately 3" so as to provide a sufficient receiver for the effluent as it trickles down through the biotreatment cubes 30. In another embodiment, the outlet conduit 154 can exit the container 126 at anti-flotation ring 134. As shown in FIG. 11, the anti-flotation ring can have a recessed area 136 surrounding outlet conduit 154 so that if outlet conduit 154 is pre-plumbed, the end of outlet conduit 154 will be protected during shipping. In a second, alternative method the biotreatment containers 126 may have an inlet at a bottom portion and an outlet in an upper portion. In this configuration the wastewater enters a lower portion of the biotreatment container 126 and rises through the coir filter media 130.

Referring back to FIG. 1, disposed between the biotreatment container 26 "A" and recirculating tank 32, is the discharge conduit 28. The recirculating tank 32 receives the biotreated wastewater from the containers 26 and is provided with two outlets, one outlet being a recirculating line 34 which recirculates a preselected amount of effluent to the septic tank 12 for further treatment and another outlet being a discharge conduit 36 which provides the means for the transfer of effluent for either further treatment or to laterals in an open field. The recirculating line 34 is in flow communication with the inlet into a riser 68 having a lower portion open into the septic tank 12. The riser 68 generally extends upward from the septic tank 12 and is provided with a cover 70 at approximately ground level. The septic tank 12 is also provided with an inlet manhole opening 72 which is disposed directly above the filter 18 for easy access into the septic tank 12 and removal or installation of filter 18.

As shown in FIGS. 4–8, a preselected recirculating tank 32 is provided with an inlet 28 which enters the recirculating tank 32 in an upper portion of the tank and the outlets 34 and 36 are provided with a plurality of inverted T-connections 74 therein with an adjustable vertically extending conduit portion 76 having a fluid inlet through-bore 76a. Vertical positioning of inlet 76a determines the quantity of wastewater that will be sent to a lateral for further treatment through line 34 or recirculates back to the septic tank 12 through line 36. As shown, the outlet 34 is provided with one T-connection 74 and the outlet 36 is provided with four T-connections 74. Thus, when the conduit portions 76 are threadably received within the body of the T-connections 74 and adjusted so the inlets 76a are at the same height as the top of the other inlets 76a, in the lines 34 and 36, then each T-connection handles the same amount of flow as the remaining T-connections. Thus, in the described embodiment, 20% of the wastewater will be discharged through line 34 and 80% of the wastewater will be discharged through line 36.

Referring now to FIGS. 14–19, providing fluid communication between the biotreatment container 126 "A" and dosing tank 20, is the discharge conduit 28. The dosing tank 20 receives the biotreated wastewater from the containers 126 and is provided with two outlets, one outlet being a recirculating device 34 which recirculates a preselected amount of effluent to the septic tank 12 or dosing basin 20 for further treatment and another outlet being a discharge conduit 36 which provides the means for the transfer of effluent for either further treatment or to laterals in an open field. The recirculating device 34 is in flow communication with the inlet into a riser 68 having a lower portion open into the dosing tank 20. The riser 68 generally extends upward from the septic tank 12 or dosing tank 20 and is provided with a cover 70 at approximately ground level. The septic tank 12 is also provided with at least one riser 68 and a cover 70 having a manhole opening 72 therein which is disposed directly above the filter 18 for easy access into the septic tank 12 and removal or installation of filter 18.

A recirculation device, such as that described in U.S. patent application Ser. No. 10/265,050 and which is incorporated by reference herein, is desirable in order to effect a recirculating septic system that directs a portion of treated wastewater effluent to the tanks and through the coir media 30 while some portion of the treated effluent to a receiving body such as a drain field at, according to one embodiment, an 80/20 split. More specifically, about eighty percent of the effluent is recirculated into the treatment system in order to dilute wastewater entering the system and aid treatment, while about twenty percent of the effluent is directed out of the system to a drain field, leach bed, or receiving body. Further the recirculation device 34 is capable of sensing the volume of fluid within the system and when the volume reaches a critically low level, retaining all of the fluid in the system so that it is continually recirculated until the fluid volume again rises above the critical level. In addition, if the nitrogen level of the effluent is a concern for an end user, the recirculation effluent 34 may be directed to the septic tank 12. The wastewater with high nitrogen levels mixes with the oxygenated effluent thereby lowering nitrogen in a denitrification process. If, however, the nitrogen level is not a concern then the effluent may be directed to the dosing basin 20.

The fluid diverting recirculation device 34 is located within a tank of a recirculating septic system. The tank maybe the septic tank 12, the dosing tank 20, or a tank specifically for receiving recirculated effluent. The recirculation device 34 is comprised of a splitter pipe 310 in flow communication with the coir media 130 in at least one biofilter container 126. The splitter pipe 310 has openings therein that permit a percentage of the water returning from the treatment media 130 to flow into the tank. The openings have flow leveling devices 325, each having leveler openings 326, covering them that allow the user to direct the flow of water out of each opening even if the splitter pipe 310 is not level. The flow leveling device 325 can also be adjusted so that more or less effluent exits one or more openings than one or more other openings. This permits fine adjustment of the percentage of effluent that recirculates back into the system. The splitter pipe 310 is further fluidly connected with a valve device 340, comprised of a valve conduit or housing 330 and a valve mechanism, which in turn is in fluid communication with the outlet 19. The valve conduit 330 houses the valve mechanism 342, which is comprised of a valve 341, a valve guide rod 344 connected to the valve 341 and extending into the tank a predetermined distance, and a float 346 attached to the rod 344 and floating in the effluent. The valve 341 moves vertically within the valve conduit in response to the effluent level within the tank raising and lowering the float 346. If the effluent drops below a critical level, the valve 341 will close such that the flow communication with the drain field is blocked. This directs all of the effluent returning to the splitter pipe 310 to exit through the openings in the splitter pipe 310 and reenter the treatment media through the tank. When the effluent level in the tank rises above the critical level, the valve will rise and permit a percentage of the filtered effluent to exit to the drain field once again. As previously mentioned, according to one embodiment about eighty percent of the effluent is recirculated into the septic tank 12 or dosing basin 20 and about twenty percent is directed to a drain field.

In operation, according to a first embodiment shown in FIGS. 1–8, wastewater discharge enters the septic tank 12 through the wastewater inlet 14 wherein the wastewater is subjected to an anaerobic treatment within the tank 12 and also the solids within the wastewater are given an opportunity to settle to the bottom of the tank 12. The effluent, by gravity, then flows through the filter 18, out through the discharge 16 and into the transfer tank 20. The anaerobically treated effluent is then pumped through conduit 22 into one or more biotreatment containers 26 wherein the wastewater is then sprayed through nozzles 52 onto the foam cubes 30 or other filter media thereby allowing the wastewater to percolate slowly downwardly through the filter media thereby allowing for anaerobic microbiological activity to take place within the container. Generally, the lids on the container are not sealed, or other air flow inlets are provided to allow a sufficient amount of air to enter the container to provide the oxygen necessary for the aerobic treatment as the wastewater percolates downwardly therethrough. Aerobically treated wastewater collects at the bottom of the container and then, by gravity, flows outwardly through outlet conduit 28 to the recirculating tank 32 wherein a preselected amount of treated effluent is returned to the tank 12 and the remainder is discharged into laterals or for other treatment.

As shown in FIG. 14, an alternative wastewater treatment system 410 of the present invention includes a basin 411 and at least one biotreatment tank 426 in fluid communication therewith. The basin 411 comprises a septic tank 412 and a dosing tank 420 separated by a common wall within the basin 411. However the septic tank 412 and dosing tank 420 may be separate and independent units in fluid communication. For purpose of this description, an influent is defined as a fluid moving into a control volume and an effluent is defined as a fluid, preferably having undergone some treatment process, exiting the same control volume. As previously described the septic or settlement tank 412 receives wastewater, including organic matter, pathogens, and other particulates. An inlet 414 is provided for receiving the wastewater into the septic tank 412 and an outlet 416 is provided for the discharge of wastewater therefrom. The septic tank 412 is generally provided with a filter 418 attached to outlet 416 which removes most of the particulates from the wastewater that have not settled out or have broken down from the anaerobic activity occurring within the tank 412. The filter 418 may be any well known filter which is commercially available, such as the Zabel Industries's A300-8x18-VC filter. The effluent, by gravity, flows from the septic tank 412 through the outlet 16 into the holding or dosing tank 420. The dosing tank or basin 420 generally includes a pump 417, shown in FIG. 16, for pumping the effluent into a biotreatment or biofilter containers 126 by way of conduit 422. It is realized that the wastewater may be transferred from dosing tank 420 to containers 126 by other means such as gravity, if appropriate.

As best shown in FIG. 14, a plurality of biotreatment containers 126 can be connected in series wherein effluent pumped from holding tank 420 enters the biotreatment containers 126 through an inlet pipe 425 into a first biotreatment container 126 identified by the letter A. As shown in FIG. 2, there are three biotreatment containers 126 and each container is identified by the letters A, B, and C. Providing flow communication between the biotreatment containers is a header pipe 424 and a plurality of inlet pipes 425. Disposed between the inlet pipes 425 and container 126 may be fittings, such as quick disconnects and grommets for quick connection and disconnection of the biotreatment containers 126. However, other connections may be utilized in connecting the inlet effluent piping 425 to the containers 126.

Referring now to FIGS. 9 and 10, the biotreatment containers 126 may comprise various shapes and volumes for holding various amounts of coconut based coir filter media 130 and therefore may be sized according to anticipated loading. Each of the containers 126 is provided with at least one lid 160 to cover an access opening, generally an interlocking lid, and as shown in FIG. 12, in many instances, two lids 160 are utilized for each container 126.

The coconut coir filter media 130 may be formed in various shapes providing a desirable amount of surface area for colonization of microorganisms. The coir provides a natural substrate with a large surface area that is highly resistant to degradation in an aquatic environment. It is also a source of organic carbon, which aids in the de-nitrification of the wastewater. According to one embodiment, the coconut coir 130 may be loaded in to the biofilter container 126 in block form, as shown FIG. 9, whereupon wetting, the fibrous media coir 130 breaks apart and expands in the container 126. The fibrous media coir material 130 may have characteristics including a length of about 30 mm and a diameter of about 16 microns. The coir 130 may have a composition of about 45% lignin, 43% cellulose, and about 2% ash. The amount of coconut coir material 130 used may vary and may be defined based on the flow rate of wastewater influent entering the bio-treatment container 126. According to at least one embodiment, the dosing rate may be about 10 gallons per day per cubic foot (GPD/ft$^3$) of coir material or less. However, the dosing rate may vary depending on the volume of coir filter material 130 used. The coir material 130 provides several advantages including excellent drainage characteristics and air permeability, long life even when submerged in water, substantially odorless material, uniformity of composition, and a biodegradable nature. The porous coir substrate provides a means for microbes to grow when oxygen is introduced to the system wherein the microbes may biodegrade nitrate and/or other chemicals from the wastewater introduced to the biotreatment container 126. When the porous coir material 130 is initially placed in the biotreatment container 126, it is initially in a compressed block form. When liquid is introduced to the container 126, the coir material blocks breaks apart and may expand by a factor of about at least two and upto about 3 depending on the compression of the coir block. Upon expanding, the coir material 130 assumes the shape of at least the lower portion of the container 126 and substantially seals the container so that any material must pass through the coir in order to exit the container 126. The coir material 130 allows for capillary action of wastewater wherein the constriction is tight enough for treatment yet not so tight as to cause a backup and overflow of wastewater.

Referring now to FIGS. 3,4,5, and 6, the outlet conduit 154 can exit the container 126 at anti-flotation ring 134. As shown in FIG. 5, the anti-flotation ring can have a recessed area 136 surrounding outlet conduit 154 so that if outlet conduit 154 is pre-plumbed, the end of outlet conduit 154 will be protected during shipping.

According to the second embodiment shown in FIGS. 9–19, the coconut coir media 130 is placed in the biofilters 126, the influent wastewater is then sprayed through nozzles 152 onto the coconut coir filter media 130, thereby allowing the wastewater to percolate slowly downwardly through the filter media 130. Alternatively wastewater influent may be introduced near a lower portion of the biofilter container and percolate upward through the coir filter material. During percolation through the coir filter media 130, the wastewater is treated by microbial growths living in the coconut coir and supported by oxygen supplied to the container. The influent wastewater flowing into the biotreatment container may have a bio-chemical oxygen demand concentration (BOD$_5$) of between about 100 milligrams per liter and 200 milligrams per liter. In addition, the influent wastewater flowing into the biotreatment container may have a total suspended solids (TSS) concentration of between about 50 milligrams per liter and 150 milligrams per liter.

Aerobically treated wastewater collects at the bottom of the container and then, by gravity, flows outwardly through outlet conduit 428 to the septic tank 412 or dosing tank 420. When the effluent is removed from the biofilter container 126, a preselected amount of treated effluent is returned to the septic tank 412 or dosing tank 420 and the remainder is discharged into laterals or for other treatment.

Table I depicts the secondary treatment standards for a bio-chemical oxygen demand concentration and total suspended solids concentration of the treated effluent exiting the bio-treatment container 126. As depicted in Table I, after percolating through the coir filter material 130, the effluent wastewater may have a bio-chemical oxygen demand concentration of about thirty (30) milligrams per liter or less over a thirty-day average. Within that thirty day average, any seven-day average test may result in a BOD and/or TSS concentration of about 45 milligrams per liter or less. The effluent may also have a total suspended solids concentration of 30 milligrams per liter or less. Therefore the final row of Table I shows a removal of 85% of the total suspended solids and Bio-chemical oxygen demand.

TABLE I

| Parameter | 30-Day Average | 7-Day Average |
|---|---|---|
| BOD | 30 mg/L | 45 mg/L |
| TSS | 30 mg/L | 45 mg/L |
| Removal | 85% BOD and TSS | — |

It will be realized that various changes may be made to the specific embodiment shown and described without departing from the principals and spirit of the present invention.

What is claimed is:

1. A method of treating wastewater comprising the steps of:
   a. placing a filtering material consisting essentially of coir in a bio-treatment container having an inlet and an outlet;
   b. providing an oxygen supply to an interior of said container;
   c. introducing wastewater influent into said bio-treatment container through said inlet, said influent wastewater having total suspended solids concentration of about 50 millagrams per liter;
   d. expanding said filtering material with said wastewater influent whereby said filtering material assumes the shape of at least a lower portion of said container;
   e. percolating said wastewater influent through said coir material and producing an effluent; and,
   f. removing said effluent from said bio-treatment container.

2. The method of claim 1, said bio-treatment container being a watertight container.

3. The method of claim 1, said influent wastewater having a bio-chemical oxygen demand concentration of about 100 milligrams per liter.

4. The method of claim 1, said inlet being positioned at an upper portion of said bio-treatment container.

5. The method of claim 4, further comprising the step of percolating said influent wastewater downward through said coir material.

6. The method of claim 5, further comprising the step of removing said effluent from a lower portion of said container.

7. A method of treating wastewater, comprising the steps of:
   a. placing a filtering material consisting essentially of coir in a bio-treatment container having an inlet and an outlet;
   b. providing an oxygen supply to an interior of said container;
   c. introducing wastewater influent into said bio-treatment container through said inlet, said influent wastewater having total suspended solids count of about 150 millagrams per liter;
   d. expanding said filtering material with said wastewater influent whereby said filtering material assumes the shape of at least a lower portion of said container;
   e. percolating said wastewater influent through said coir material and producing an effluent; and,
   f. removing said effluent from said bio-treatment container.

8. The method of claim 7, said influent wastewater having a bio-chemical oxygen demand concentration of about 200 milligrams per liter.

9. A method of treating wastewater, comprising the steps of:
   a. placing a filtering material consisting essentially of coir in a bio-treatment container having an inlet and an outlet, said inlet being positioned at a lower portion of said container;
   b. providing an oxygen supply to an interior of said container;
   c. introducing wastewater influent into said bio-treatment container through said inlet;
   d. expanding said filtering material with said wastewater influent whereby said filtering material assumes the shape of at least a lower portion of said container;
   e. percolating said wastewater influent through said coir material and producing an effluent; and,
   f. removing said effluent from said bio-treatment container.

10. The method of claim 9, further comprising the step of percolating said influent wastewater upward through said coir material.

11. The method of claim 10, further comprising the step of removing said effluent from an upper portion of said bio-treatment container.

12. A method of treating wastewater comprising the steps of:
   a. placing a predetermined volume of a filter material consisting essentially of a coconut coir material in a bio-filter container, said bio-filter container having an inlet and an outlet;
   b. dosing said coconut coir material with a wastewater influent through said inlet, said influent having an average bio-chemical oxygen demand concentration of between about 100 milligrams per liter and 200 milligrams per liter and an average total suspended solids concentration of between about 50 milligrams per liter and 150 milligrams per liter;
   c. expanding said coconut coir material with said wastewater influent whereby said coconut coir material assumes the shape of at least a lower portion of said container;
   d. percolating said wastewater influent through said coir material and producing an effluent; and,
   e. removing said effluent from said container, said effluent having a total suspended solids concentration of 30 milligrams per liter or less and a bio-chemical oxygen demand concentration of 30 milligrams per liter or less.

13. The method of claim 12, said influent being anaerobically treated wastewater.

14. The method of claim 12, further comprising the step of recirculating a predetermined portion of said effluent to a wastewater treatment system.

15. The method of claim 12, further comprising the step of directing a predetermined portion of said effluent to a drain field.

16. The method of claim 12, further comprising the step of providing an oxygen supply to said bio-treatment container.

17. A method of treating wastewater, comprising the steps of:
   a. placing at least about one cubic foot volume of coir material in a bio-treatment container having an inlet and an outlet;
   b. providing an oxygen supply to said bio-treatment container;
   c. dosing said coir material with wastewater influent through said inlet at a rate of at least about 400 gallons per day;
   d. expanding said coir material with said wastewater influent whereby said coir material assumes the shape of at least a lower portion of said container.

18. The method of claim 17, further comprising the step of recirculating a predetermined portion of said effluent.

19. A method of treating wastewater comprising the steps of:
   a. placing a predetermined volume of a filter material consisting essentially of a coconut coir material in a bio-filter container, said bio-filter container having an inlet and an outlet;

b. dosing said coconut coir material with a wastewater influent through said inlet;
c. expanding said coconut coir material with said wastewater influent whereby said coconut coir material assumes the shape of at least a lower portion of said container;
d. percolating said wastewater influent through said coir material and producing an effluent;
e. removing said effluent from said container, said effluent having a total suspended solids concentration of 30 milligrams per liter or less and a bio-chemical oxygen demand concentration of 30 milligrams per liter or less,
f. said influent having an average bio-chemical oxygen demand concentration of between about 100 milligrams per liter and 200 milligrams per liter and an average total suspended solids concentration of between about 50 milligrams per liter and 150 milligrams per liter.

20. The method of claim 19, said inlet being positioned at an upper portion of said bio-treatment container.

21. The method of claim 19, further comprising the step of percolating said influent wastewater downward through said coir material.

22. The method of claim 19, further comprising the step of removing said effluent from a lower portion of said container.

23. The method of claim 19, said influent being anaerobically treated wastewater.

* * * * *